United States Patent
Okada et al.

(10) Patent No.: US 7,715,152 B2
(45) Date of Patent: May 11, 2010

(54) MAGNETIC RECORDING HEAD FOR PERPENDICULAR RECORDING, FABRICATION PROCESS, AND MAGNETIC DISK STORAGE APPARATUS MOUNTING THE MAGNETIC HEAD

(75) Inventors: Tomohiro Okada, Kanagawa-ken (JP); Isao Nunokawa, Kanagawa-ken (JP); Masafumi Mochizuki, Tokyo (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 759 days.

(21) Appl. No.: 11/012,990

(22) Filed: Dec. 14, 2004

(65) Prior Publication Data
US 2005/0141137 A1 Jun. 30, 2005

(30) Foreign Application Priority Data
Dec. 24, 2003 (JP) .............................. 2003-427781

(51) Int. Cl.
*G11B 5/127* (2006.01)
*G11B 5/147* (2006.01)
*G11B 5/33* (2006.01)

(52) U.S. Cl. ............. 360/319; 360/125.13; 360/125.14; 360/125.15

(58) Field of Classification Search ................. 360/122, 360/119, 319, 320, 324.11, 324.12
See application file for complete search history.

(56) References Cited

U.S. PATENT DOCUMENTS

| | | | |
|---|---|---|---|
| 6,275,360 B1 * | 8/2001 | Nakamoto et al. | 360/319 |
| 7,075,756 B1 * | 7/2006 | Mallary et al. | 360/317 |
| 7,106,554 B2 * | 9/2006 | Guan et al. | 360/125.16 |
| 7,239,478 B1 * | 7/2007 | Sin et al. | 360/126 |
| 7,248,431 B1 * | 7/2007 | Liu et al. | 360/119.02 |
| 2002/0034043 A1 * | 3/2002 | Okada et al. | 360/125 |
| 2002/0176214 A1 * | 11/2002 | Shukh et al. | 360/317 |
| 2003/0112555 A1 * | 6/2003 | Sato et al. | 360/126 |
| 2004/0212923 A1 * | 10/2004 | Taguchi | 360/125 |
| 2005/0057852 A1 | 3/2005 | Yazawa et al. | |
| 2005/0068669 A1 * | 3/2005 | Hsu et al. | 360/125 |
| 2005/0068671 A1 * | 3/2005 | Hsu et al. | 360/125 |
| 2005/0068673 A1 * | 3/2005 | Lille | 360/126 |

(Continued)

FOREIGN PATENT DOCUMENTS

JP 2000315302 A * 11/2000

*Primary Examiner*—Andrea L Wellington
*Assistant Examiner*—Adam B Dravininkas
(74) *Attorney, Agent, or Firm*—Townsend and Townsend and Crew LLP; Rambod Nader

(57) ABSTRACT

Embodiments of the invention provide a perpendicular magnetic writing head with a suppressed effective track width to be written on a magnetic medium while increasing writing magnetic field gradient. In one embodiment a trailing side shield is disposed by way of a gap film to a main pole of a perpendicular writing magnetic head. A gap distance (Gt) on a trailing side of the main pole and a gap distance (Gs) on a lateral side of the main pole is defined as Gt<Gs, and a thickness (Gd) from an air bearing surface of the shield is made equal to or less than a throat height. Alternatively, the thickness of Gd on the side of the main pole is reduced to less than that on the trailing side of the main pole. Further, for preventing defoliation of the shield upon fabrication of the air bearing surface, a thickness for a portion away from the main pole is increased.

16 Claims, 13 Drawing Sheets

U.S. PATENT DOCUMENTS

2005/0068678 A1* 3/2005 Hsu et al. .................. 360/126
2005/0083605 A1* 4/2005 Hu et al. .................... 360/125
2005/0219743 A1* 10/2005 Guan et al. ................ 360/125

* cited by examiner

MAGNETIC RECORDING HEAD FOR PERPENDICULAR RECORDING, FABRICATION PROCESS, AND MAGNETIC DISK STORAGE APPARATUS MOUNTING THE MAGNETIC HEAD

CROSS-REFERENCES TO RELATED APPLICATIONS

This application claims priority from Japanese Patent Application No. JP-2003-427781, filed Dec. 24, 2003, the entire disclosure of which is incorporated herein by reference.

BACKGROUND OF THE INVENTION

The present invention relates to a magnetic head used for writing and reading to and from a magnetic recording medium and a magnetic recording apparatus mounting the magnetic head.

In a magnetic disk apparatus, data on a recording medium is written and read by a magnetic head. For increasing the recording capacity of a magnetic disk per unit area, it is necessary to increase the areal density. However, the current longitudinal recording system involves a problem that the areal density cannot be increased due to thermal fluctuation of magnetization of a magnetic medium as the recorded bit length is smaller. A method capable of overcoming the problem includes a perpendicular recording method of recording magnetization signals in the direction perpendicular to the magnetic medium. The perpendicular recording system can use a giant magneto-resistive head (GMR head), a tunneling magneto-resistive head (TMR head) having higher read output and a CPP (current perpendicular to the plane) type GMR head of flowing current perpendicular to the film plane for reading. On the other hand, it is necessary to use a single pole head for writing. Also in the perpendicular recording, it is necessary to improve the track density and the linear recording density in order to improve the longitudinal recording density. In order to improve the linear recording density, it is necessary to improve the recording magnetic field gradient of the recording head. For this purpose, a dual layered structure is adopted for a recording medium in which a soft underlayer (SUL) is disposed as a lower layer. However, for attaining higher recording density above 200 Gb/in2, further improvement of the magnetic field gradient from the recording head is also necessary. Moreover, for improving the track density, the track width of the magnetic head has to be made finer and more accurate. However, as the track is made narrower, a problem that an effective track width to be written into a magnetic medium is larger than the geometric track width becomes conspicuous and this imposes a significant restriction on the improvement of the track density. For overcoming the problem, U.S. Patent Publication No. 2002/0176214A1 or "The Magnetic Recording Conference (TMRC) 2003" (abstract No. E6), for example, disclose an example of a perpendicular recording head provided with a side shield as shown in FIG. 20. A view from an air bearing surface (ABS) is shown on the left and a cross-sectional view perpendicular to the air bearing surface is shown on the right of FIG. 20. A read head is also shown in the drawing.

The documents described above state that a side shield is provided for controlling the track width to be written into a magnetic medium, but the gap distance on the trailing side is larger than the gap distance on the side, and the recording magnetic field gradient which is important in the recording process together with the magnetic field intensity is insufficient. Further, while the magnetic field intensity decreases greatly when the side shield is provided, a structure for not decreasing the magnetic field intensity is insufficient.

BRIEF SUMMARY OF THE INVENTION

Embodiments of the present invention provide a magnetic head for use in perpendicular recording, for keeping the recording magnetic field intensity and also improving the recording magnetic field gradient while suppressing the extension of the effective track width to be written to a magnetic medium, and a manufacturing method thereof, as well as a magnetic recording apparatus mounting the magnetic head.

A magnetic head according to one aspect of the present invention includes a main pole, a return pole, and a trailing side shield disposed in a cross-track direction and a trailing direction of the main pole in which a gap distance Gt between the main pole and the trailing side shield in the trailing direction, and a gap distance Gs between an edge on a trailing side of the main pole and the trailing side shield in the cross-track direction satisfy a relation: Gs>Gt, and a thickness Gd from an air bearing surface of the trailing side shield for a portion of the trailing side shield opposing to the main pole is equal to or smaller than a throat height of the main pole. Alternatively, it has a feature in that the relation Gs>Gt is satisfied and a thickness Gdt for an opposed portion opposing to the main pole from the cross-track width direction is smaller than the thickness Gd for an opposed portion opposing to the main pole from the trailing side of the main pole in view of the thickness from the air bearing surface for a portion of the trailing side shield opposing to the main pole.

In some embodiments, the thickness from the air bearing surface of the trailing side shield is minimized just above the main pole and increases in the cross-track direction, that is, the thickness (Gds) at a position away from the cross-track direction is larger than the thickness (Gd) above the main pole. Further, the thickness (Gd) from the air bearing surface of the trailing side shield may be increased more than that at the vicinity of the main pole away from the main pole to the trailing side.

For attaining a high recording density in the perpendicular magnetic recording described above, it is necessary to improve the recording magnetic field intensity, the recording magnetic field gradient and the recording magnetic field distribution in the cross-track direction of a magnetic head. While trailing side shield is effective for the improvement of the recording magnetic field distribution in the cross-track direction, it is also necessary to take a balance between the recording magnetic field gradient and the recording magnetic field intensity. For this purpose, it is important to control the distance between the main pole and the trailing side shield and the thickness from the air bearing surface of the trailing side shield. At first, in view of the relation between the gap (Gt) between the trailing side of the main pole and the trailing side shield, and the gap (Gs) between the lateral side of the main pole and the trailing side shield, it is necessary that Gs be larger (Gs>Gt). Since Gt=20 to 60 nm as a typical value, Gs is about 70 to 120 nm. Such a gap length can be attained by forming a main pole, then forming an alumina film, for example, by sputtering, and, subsequently, etching the same, for example, by ion milling. By selecting the sputtering method and the incident angle of ion milling (for example, about 45 to 60 degrees), not only can the gap film be formed at a good controllability for the thickness but also the gap film can be formed so as to conform the main pole formed in a trapezoidal shape. It is naturally possible to utilize, for example, chemical mechanical polishing (CMP) for planarization of the upper surface.

Further, for suppressing the decrease of the magnetic field intensity, it is necessary that the thickness Gd from the air bearing surface for a portion of the trailing side shield adjacent with the main pole be equal to or smaller than the throat height of the main pole. The throat height means, as shown in FIG. 10, a length from the air bearing surface to a portion where the width of the track width portion of the main pole flares (flare point). Since the throat height is from 100 to 300 nm as a typical value, Gd is from about 50 to 250 nm. Such a thickness can be formed by plating with photoresist frame. Since plating is applied to a portion where a resist frame is formed by using a stepper, positioning at high accuracy is possible, that is, the thickness from the air bearing surface of the trailing side shield can be made highly accurate. Any of soft magnetic materials may be used for the plating material. For example, permalloy (NiFe) can be utilized as a typical material. Naturally, other magnetic materials, for example, CoFeCu, NiFeCr, NiFeCo, etc., may also be used with no problems.

In a case where the thickness from the air bearing surface of the trailing side shield is thin, the trailing side shield may possibly be defoliated from the air bearing surface. Then, such defoliation can be suppressed by defining the thickness for a portion adjacent with the main pole to a size as described above and increasing the thickness for a portion away from the main pole.

Another method of suppressing the decrease in the magnetic field intensity is to reduce the thickness of the trailing side shield in contact with the side of the main pole to less than the thickness for a portion adjacent with the trailing side. In this case, the thickness of the trailing side shield adjacent with the trailing side may be larger than that of the throat height.

Further, for the increase of the magnetic field intensity, it is effective to provide taper on the leading side of the main pole toward the air bearing surface and decrease the thickness of the main pole toward the air bearing surface. As the effect thereof, the recording magnetic field intensity can be increased by about 30% compared with a case of not providing taper.

The trailing side shield is preferably connected magnetically with the return pole. However, in a case where the size of the trailing side shield is sufficiently larger than the main pole, for example, it is 100 times or more in view of the area ratio for the portion exposed to the air bearing surface, the trailing side shield does not have to be connected magnetically to the return pole. This is because magnetic fields pass directly from the trailing side shield to the magnetic medium. For the connection method of the trailing side shield with the return pole, the trailing side shield in itself may be connected directly to the return pole or may be connected by way of a connection pole made of another magnetic material to the return pole. For example, in a case where the trailing side shield is disposed between the main pole and the return pole, the trailing side shield and the return pole can be connected directly. In a case where the trailing side shield is not present between the main pole and the return pole, use of the connection pole is necessary. In this case, the connection pole is preferably made of a soft magnetic material. For example, while a permalloy is applicable, other soft magnetic materials may naturally be used. Further, for the purpose of magnetic domain control of the shield, the trailing side shield may be formed of a multi-layered film of magnetic layers and non-magnetic layers. This can be attained easily by a method of changing the composition of the magnetic films by changing plating conditions or by alternately conducting magnetic plating and non-magnetic plating. CoFeCu is an example of the former capable of changing the composition of the plating film by changing the plating condition. As the latter method, a lamination film, for example, of permalloy and Cr can be formed as the lamination film of magnetic plating films and non-magnetic plating films.

Further, for the method of manufacturing the magnetic head, combination of well-achieved sputtering method and ion milling can be used. A trailing side shield is formed by first forming alumina by sputtering on a main pole, etching alumina by ion milling, forming thereon a plating seed layer, forming a photoresist pattern, plating a magnetic film, and removing unnecessary portion of the photoresist pattern, the plating seed layer and the plating layer successively. In addition, the gap can be formed also by using plasma chemical vapor deposition (CVD). In this case, a film, for example, of Si, SiON, SiC, $SiO_2$, $Si_3N_4$ or diamond-like carbon (DLC), may also be used for the gap film.

In the structure where the main pole has a flare point, the thickness from the air bearing surface of the shield on the side of the main pole can be reduced at a portion adjacent to the main pole.

In the magnetic disk apparatus, since a skew angle is present in view of access to the inner circumference and the outer circumference of the disk, this results in a problem of side writing depending on the shape of the main pole, particularly, in perpendicular decoding. As the countermeasure, it is preferred in view of the width of the main pole to make the trailing side wider and the leading side narrower, that is, to form a trapezoidal shape. In a hard disk drive with no skew, such an inverted trapezoidal shape is not necessary.

By the provision of the trailing side shield adjacent with the main pole and defining the relation between the gap distance (Gt) on the trailing side and the gap distance (Gs) on the lateral side of the main pole as Gt<Gs, the recording magnetic field distribution in the cross-track direction can be improved while improving the recording magnetic field gradient and the extension of the effective track width written to the magnetic medium can be suppressed. Further, by defining the thickness (Gd) from the air bearing surface of the trailing side shield to less than throat height, or decreasing the Gd on the lateral side to less than that on the trailing side of the main pole, the recording magnetic field intensity can be maintained. Further, by setting the thickness (Gd) of the trailing side shield to the thickness described above only in the vicinity of the main pole and increasing the thickness for the portion away from the main pole, defoliation of the trailing side shield upon fabrication of the air bearing surface can be prevented.

BRIEF DESCRIPTION OF THE DRAWINGS

FIG. 15 is a schematic view showing a relation of a trailing side shield from an air bearing surface on the lateral side of a main pole.

FIG. 16 is a schematic view showing a relation for a main pole, a gap film and the shape of a trailing side.

DETAILED DESCRIPTION OF THE INVENTION

Specific embodiments of the present invention are to be described with reference to the drawings. For the sake of easy understanding, identical components or features are described while attaching identical references throughout the drawings.

Figure 1:
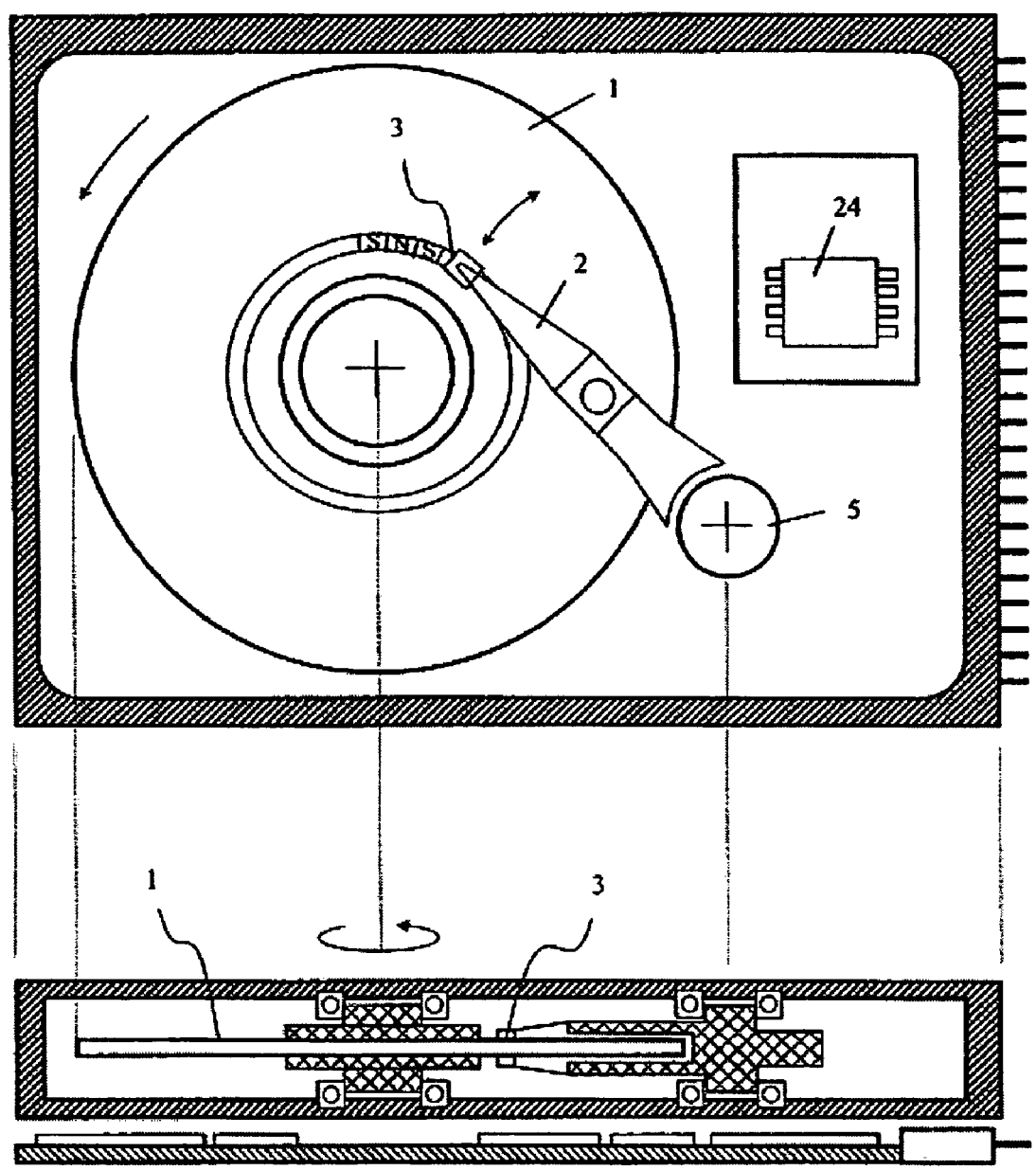
FIG. 1 is a schematic view of a magnetic recording apparatus.

FIG. 1 is a schematic view of a magnetic recording and apparatus. In the magnetic recording and reading apparatus, magnetization signals are written and read by a magnetic head 3 fixed to the end of an arm 2 on a magnetic disk 1 driven rotationally by a motor. The arm 2 is driven in the radial direction of the disk by an actuator 5 and positioned on a written or read track. Writing signals for driving the magnetic head 3 or reading signals sent from the magnetic head are processed by a signal processing circuit 24.

Figure 2:
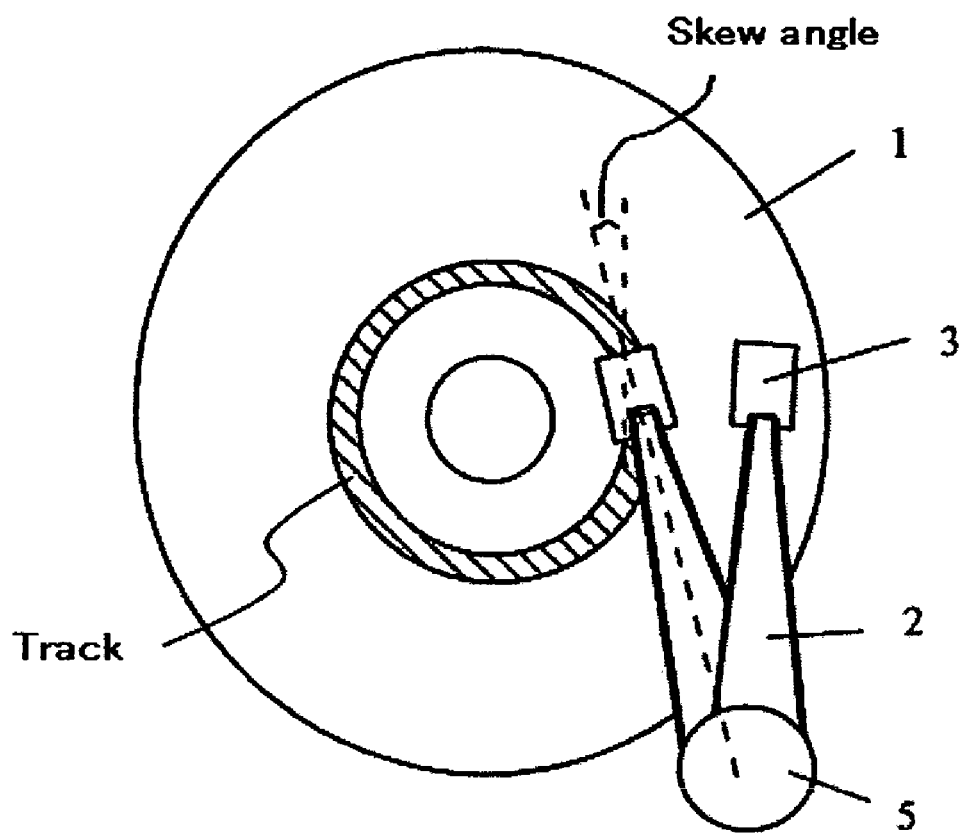
FIG. 2 is a schematic view for the operation state of the magnetic recording apparatus.

FIG. 2 shows a schematic view when the magnetic head 3 is moved by swinging the arm on the magnetic disk 1. In this case, a skew angle as shown in the drawing is formed. The range for the skew angle is about ±20°.

Figure 3:
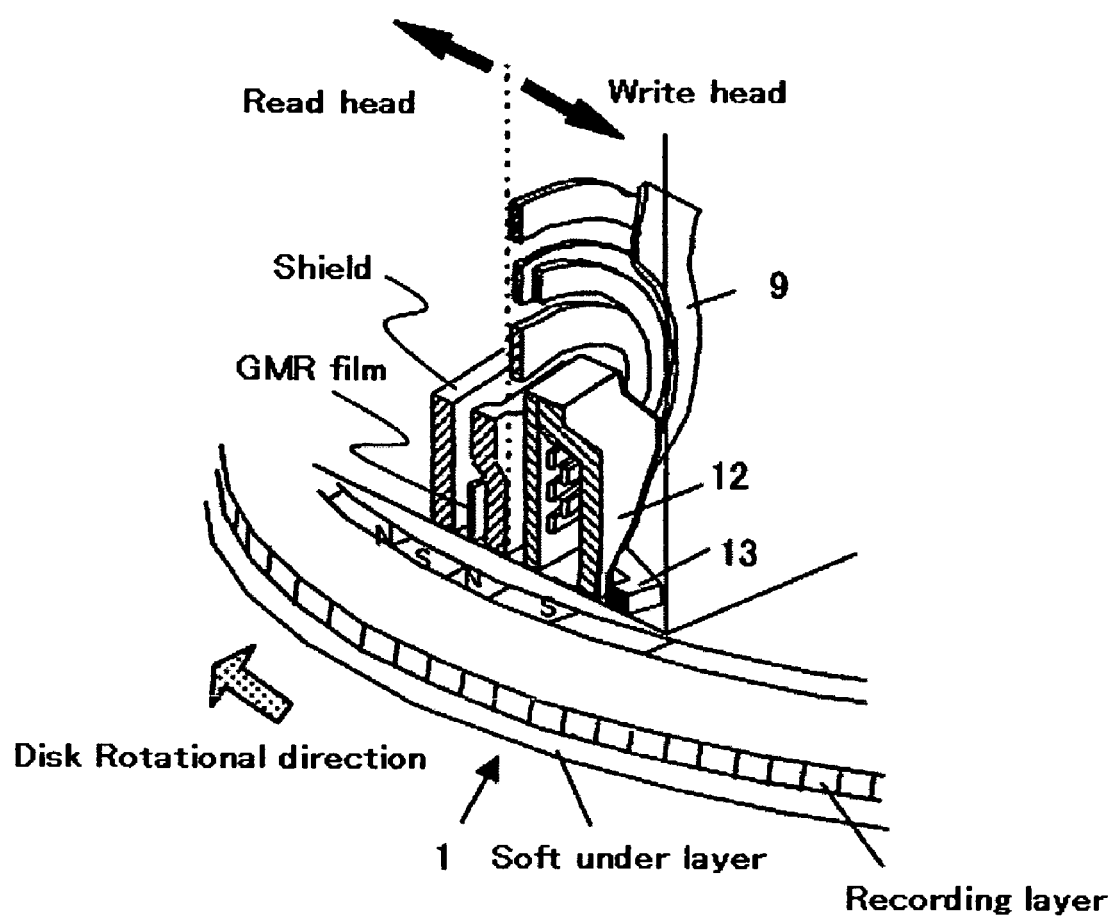
FIG. 3 is a schematic view of a perpendicular recording magnetic head.
Figure 4:
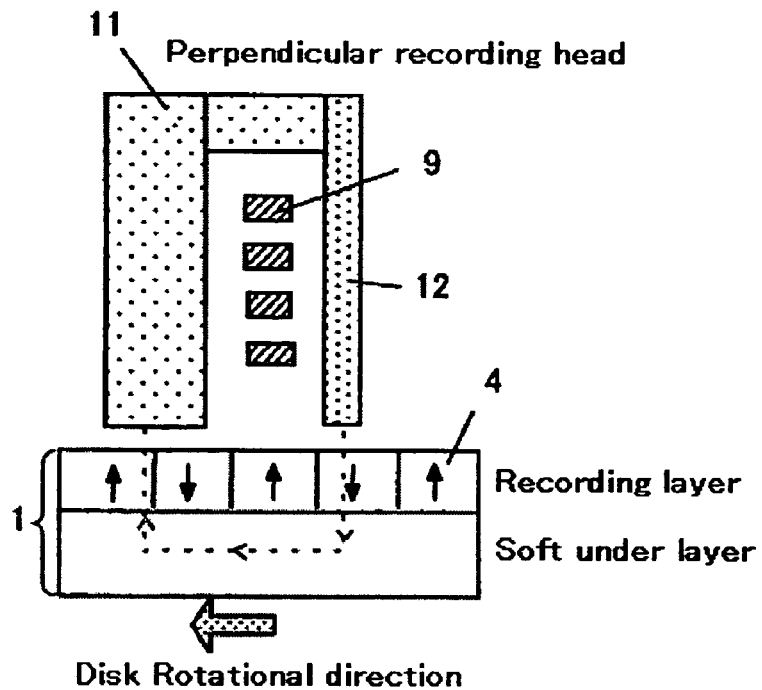
FIG. 4 is a schematic view for perpendicular recording.

FIG. 3 is a schematic view showing a relation between a perpendicular recording magnetic head and a magnetic disk. FIG. 4 is a schematic view showing perpendicular recording. The magnetic head comprises a writing head and a reading head. The writing head generates magnetic fields for writing to a recording layer of the magnetic disk 1, which is a single pole head comprising a main pole 12, a return pole 11, and a thin film coil 9 crossing a magnetic circuit formed by the main pole and the return pole. The reading head is a head for reading information written into the recording layer of the magnetic disk 1 and has a reading device such as a GMR device put between a pair of reading shields. Magnetic fields emitted from the main pole 12 of the writing head form a magnetic circuit that passes through the recording layer and the soft seed layer of the magnetic disk 1 and enters the return pole 11 and record a magnetization pattern 4 to the recording layer. In this case, in view of the relation with the rotational direction of the disc, the shape for the portion where the main pole 12 leaves finally from a certain point of the magnetic disk, that is, the upper surface (trailing side) and the lateral surface of the main pole gives a significant effect on the shape of the magnetization pattern.

Figure 5:
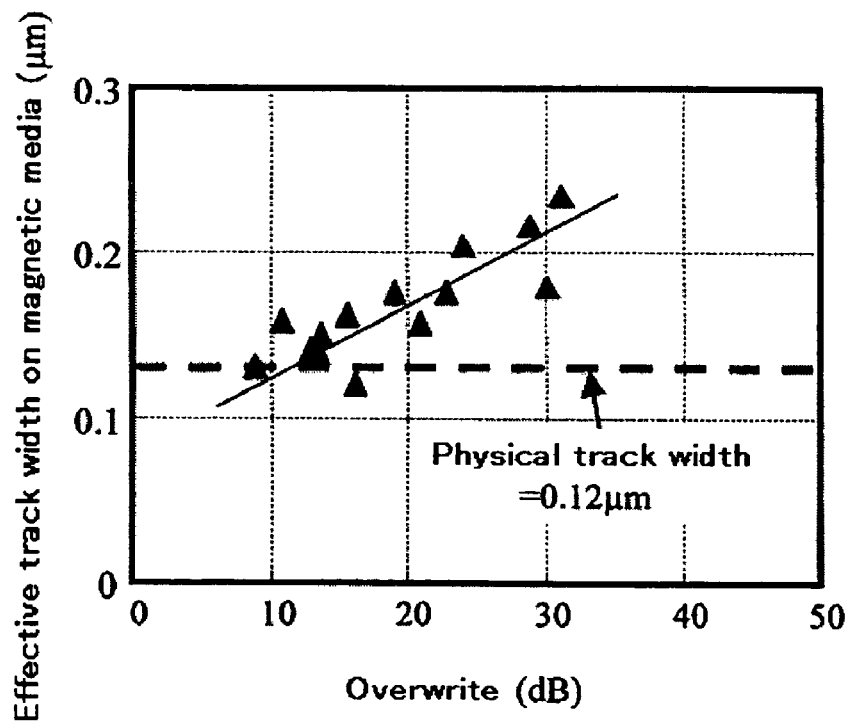
FIG. 5 is a graph showing an effective track width on a magnetic medium and a geometric track width of a head.

FIG. 5 shows a relation between an effective track width written to a magnetic medium and a geometric track width in a case of using an existent perpendicular head. Since overwrite is necessary by 30 dB or more, it can be seen from the drawing that the effective track width written to the magnetic medium is larger than the geometric track width.

Figure 6:
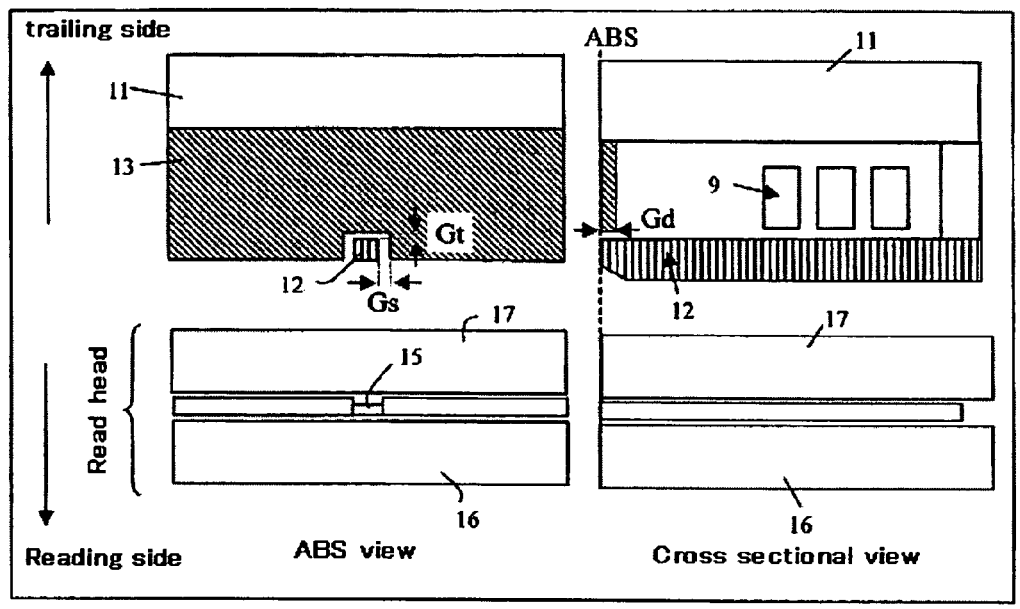
FIG. 6(*a*) is a schematic view of a perpendicular recording magnetic head according to an embodiment of the invention and FIG. 6(*b*) is a schematic view of another perpendicular recording magnetic head according to a different embodiment of the invention.
Figure 6:
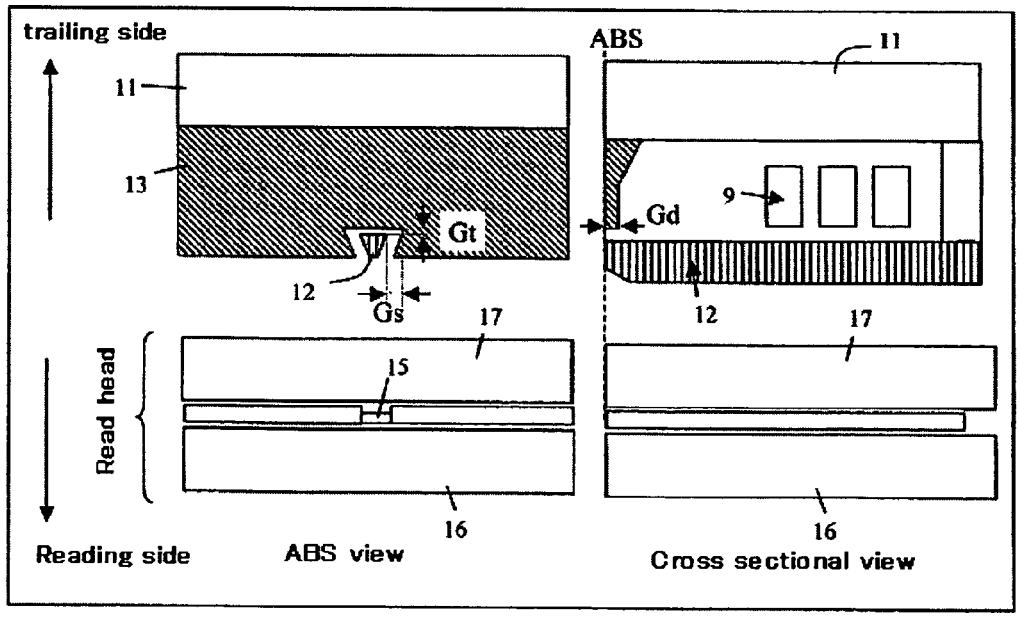

FIG. 6 is a schematic view showing an example of a composite writing/reading head according to embodiments of the invention. The composite writing/reading head includes a single pole head having a main pole 12 and a return pole 11 as a writing head, and the reading head has a magneto-resistive device 15 put between a pair of reading shields (lower shield 16 and upper shield 17). For the reading device 15, a giant magneto-resistive (GMR) device, a tunnel magneto-resistive (TMR) device and a CPP type GMR device for flowing current perpendicular to the film plane can be used.

In the writing head, a trailing side shield 13 located in the cross-track direction and the trailing direction of the main pole is disposed for suppressing deviation between the effective track width and the geometric track width. For improving the magnetic field distribution in the cross-track direction applied from the writing head to the magnetic recording layer of the magnetic disk, a distance (Gs) in the cross-track direction between the end of the main pole 12 on the trailing side and the trailing side shield 13 is important and for making the magnetic field gradient abrupt, it is important to control the distance (Gt) in the trailing direction between the main pole 12 and the trailing side shield 13.

FIG. 6(a) shows a case in which the air bearing surface of the main pole 12 is rectangular and the lateral side of the trailing side shield 13 stands perpendicular to the leading side, while FIG. 6(b) shows an example in which the air bearing surface shape of the main pole 12 is an inverted trapezoidal shape and a trailing side shield is formed along the taper on the lateral surface of the main pole. Further, in the example of FIG. 6(b), the lateral surface shape of the trailing side shield 13 on the side facing the main pole 12 may be perpendicular like in FIG. 6(a). Further, in any of the examples, the leading side of the main pole 12 is in a tapered shape, and the thickness of the main pole 12 is reduced from the upper portion in the direction of the height of the device to the air bearing surface. With the tapered structure of the main pole 12, the writing magnetic field intensity can be improved by about 30% relative to a case with no taper. Since the writing performance is determined depending on the relation with the coercivity of the magnetic medium, the taper may be saved in a case where the coercivity of the magnetic medium is small and there is no problem in the writing performance of the head.

Figure 7:
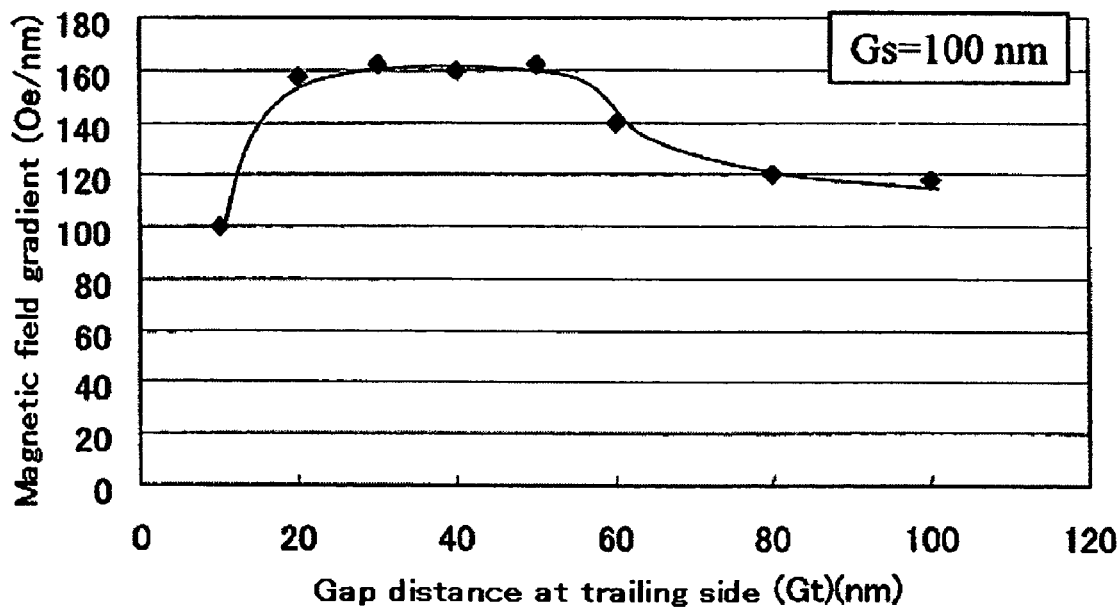
FIG. 7 is a graph showing a relation between the recording magnetic field gradient and a gap distance on the trailing side of a main pole.
Figure 8:
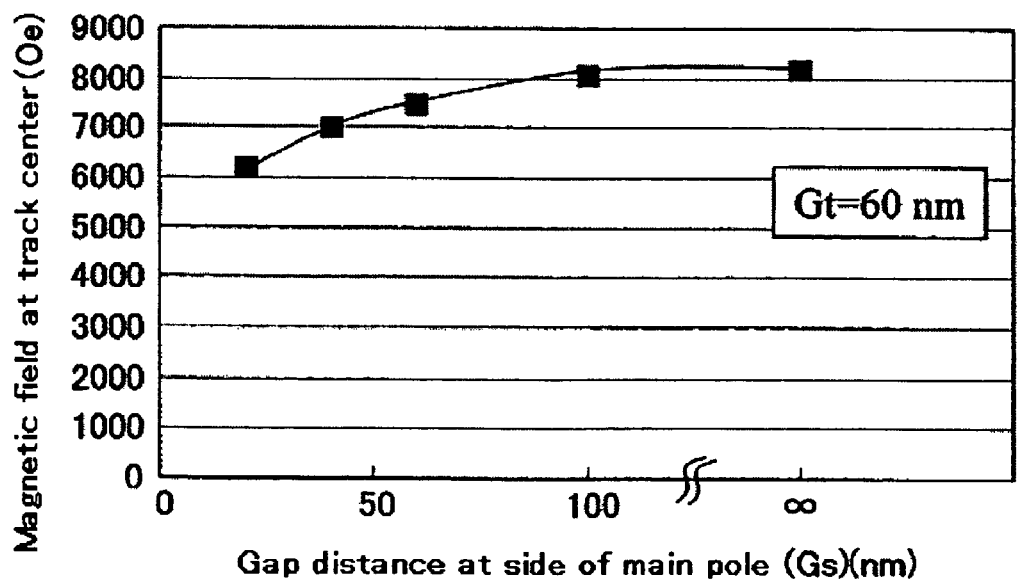
FIG. 8 is a graph showing a relation between a writing magnetic field and a gap distance on side of a main pole.

FIG. 7 shows a relation between the magnetic field gradient and a gap distance (Gt) on the trailing side at Gs=100 nm. As can be seen from the graph, the magnetic field gradient is sufficiently high in a region of Gt from about 20 nm to 60 mm. FIG. 8 shows a relation between the gap distance (Gs) on the lateral side of the main pole and the writing magnetic field intensity when Gt=60 nm. It can be seen that the magnetic field intensity is comparable with that in a case with no trailing side seal in a case where the gap distance on the lateral side is 70 nm or more. That is, it is important that the gap distance on the lateral side is larger than the gap distance on the trailing side (Gs>Gt).

Figure 9:
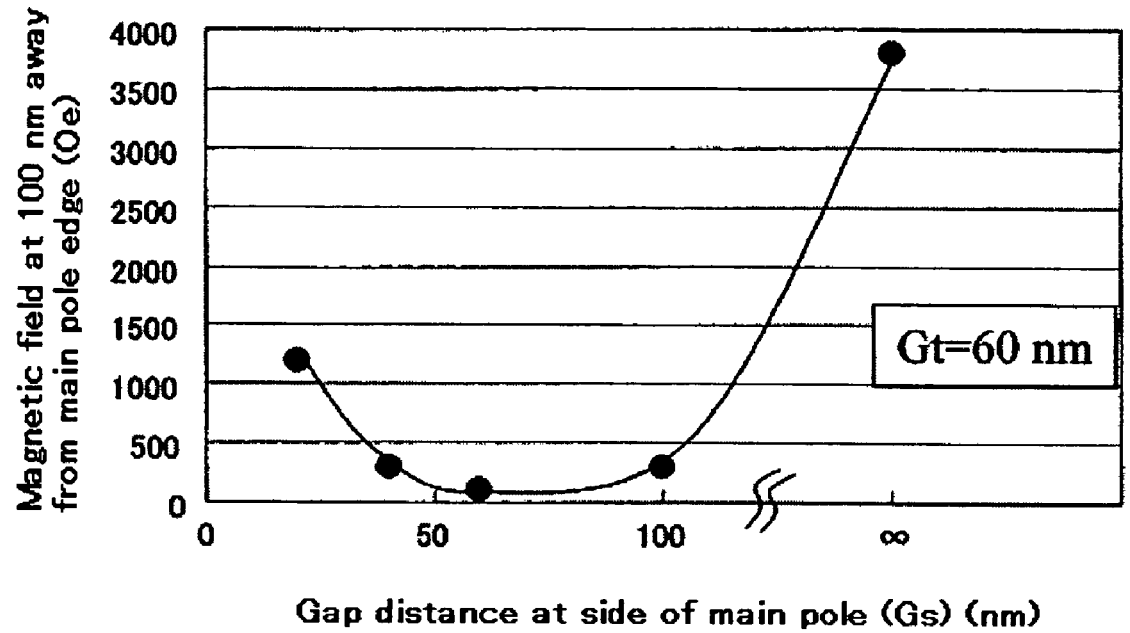
FIG. 9 is a graph showing a relation between a magnetic field at 100 nm away from the lateral side of a main pole and a gap distance on the side of the main pole.

FIG. 9 shows a relation between the magnetic field intensity at a position 100 nm away from the main pole edge in the cross-track direction and the gap distance (Gs) on the lateral side of the main pole when Gt=60 nm. The magnetic field intensity can be lowered at Gs of about 40 to 100 nm. That is, the effective track width with respect to the magnetic medium can be narrowed. As described above, we have found that side extension of the magnetic field can be suppressed while maintaining the magnetic field intensity and improving the magnetic field gradient by controlling Gt to about 20 to 60 nm and Gs to about 70 to 100 nm.

Figure 10:
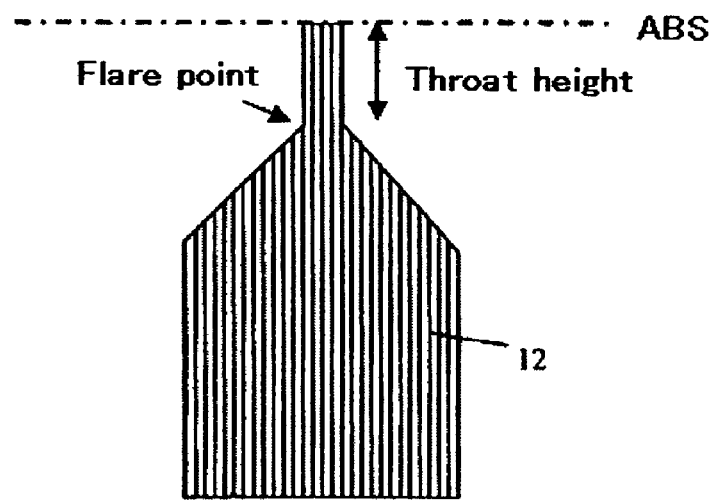
FIG. 10 is a schematic view for the gap of a main pole.
Figure 11:
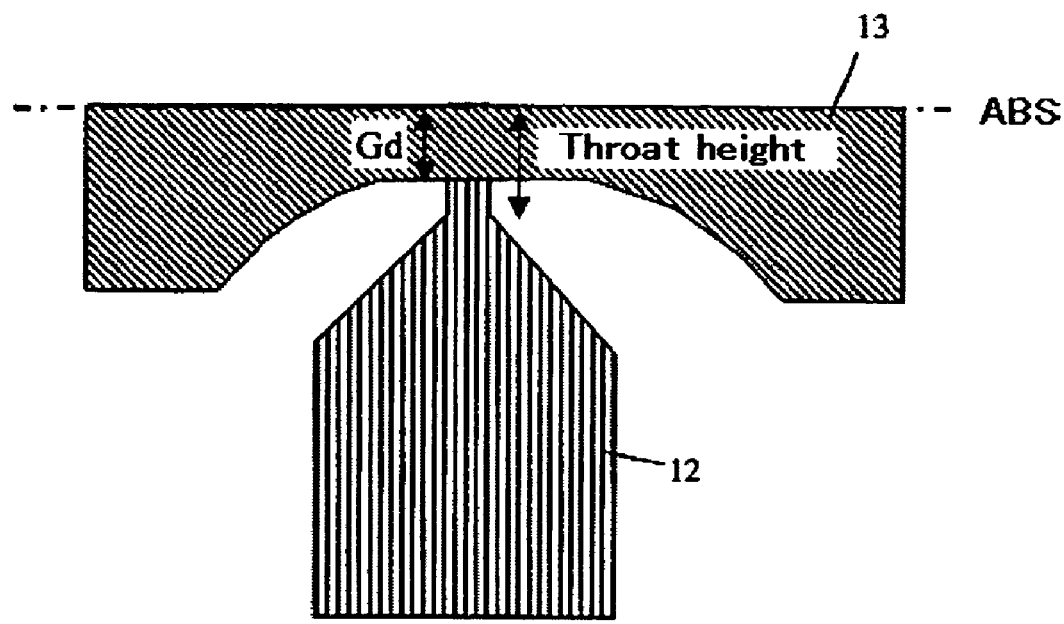
FIG. 11 is a schematic view showing a throat height and a thickness of a trailing side shield from an air bearing surface.

FIG. 10 shows the main pole 12 as viewed from the top surface. The length from the air bearing surface to a portion where the track width flares (referred to as a flare point) is referred to as a throat height. FIG. 11 shows the throat height and the trailing side shield 13 as viewed from the top surface. As will be described later, for suppressing the decrease in the writing magnetic field, it is important that the thickness (Gd) from the air bearing surface of the trailing side shield 13 is less than the throat height. However, in a case where the thickness from the air bearing surface of the trailing side shield 13 is thin, the trailing side shield 13 may be defoliated from the air bearing surface upon fabrication of the air bearing surface. Then, defoliation of the trailing side shield 13 caused by fabrication to the air bearing surface can be suppressed by making the thickness for a portion adjacent to the main pole 12 to equal to or less than the throat height and increasing the thickness for a portion away from the main pole 12 as shown in FIG. 11.

Another method of preventing defoliation by the fabrication of the air bearing surface is to make the thickness of the trailing side shield 13 thinner in the vicinity of the main pole and the thickness for the portion more away to the trailing side thicker, that is, to change the shape of the trailing side seal 13 in the direction of the film thickness. The trailing side shield 13 shown in FIG. 6(b) is decreased for the thickness in the vicinity of the main pole and increased for the thickness as it away from the main pole to the trailing side. Such a shape can be attained by controlling the shape of a photoresist frame form in a case of forming the trailing side shield 13 by frame plating (plating with photoresist frame). Specifically, it can be attained by changing the focus position of a stepper upon exposure.

The cross sectional shape of the trailing side shield 13 shown in FIG. 6(b) can be formed, for example, by defining it to a plus focus position in a case of a stepper manufactured by Nikon Co. and to a minus focus position in a case of a stepper manufactured by Canon Co.

Figure 12:
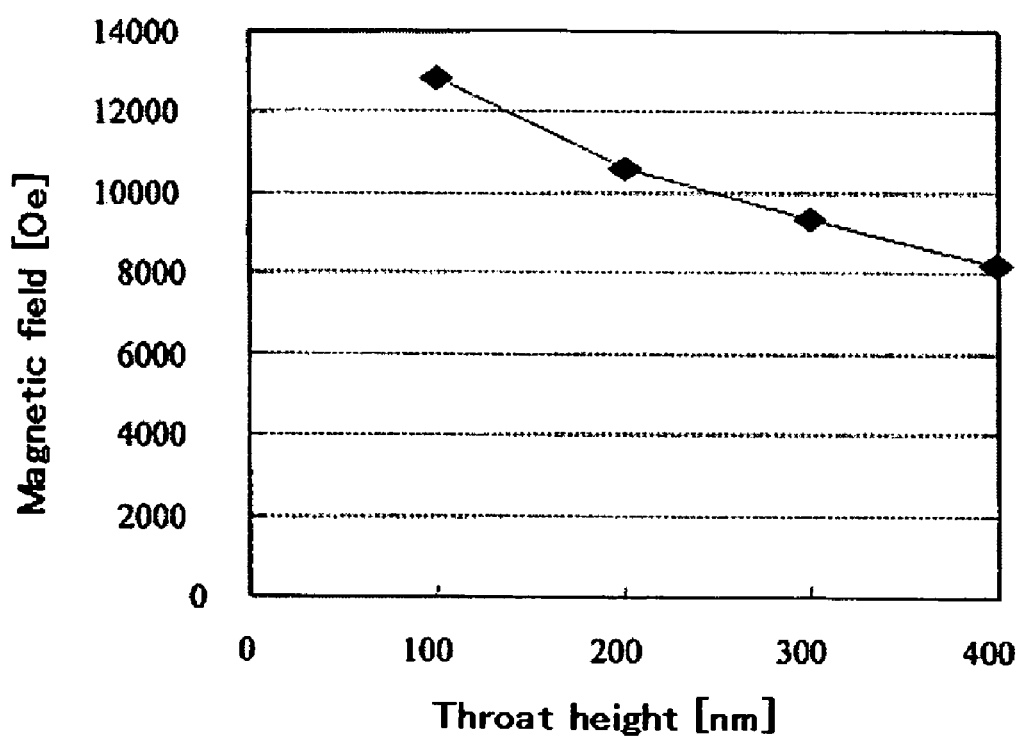
FIG. 12 is a graph showing a relation between a magnetic field intensity and a throat height.
Figure 13:
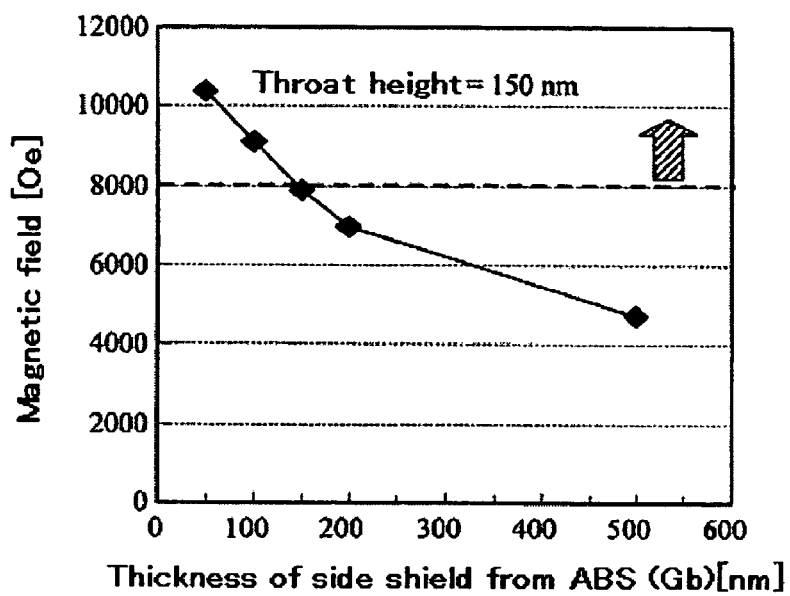
FIG. 13 is a graph showing a relation between a magnetic field intensity and the thickness of a side shield from an air bearing surface.

FIG. 12 shows a relation between a magnetic field intensity and a throat height in a case of not using a trailing side shield. Since the writing magnetic field intensity decreases as the throat height increases, the throat height is preferably about 300 nm or less. FIG. 13 shows a relation between a magnetic field intensity and a thickness from the air bearing surface of a side shield at a throat height, for example, of 150 nm. Since the coercivity of a typical magnetic medium is 4000 Oe, about 8000 Oe of magnetic field generated from the head is necessary and it can be seen that Gd is desirably about 150 nm or less which is less than the throat height. In a case where the thickness (Gd) from the air bearing surface of the trailing side shield in adjacent by way of a gap to the main pole is large and the trailing side shield is near the flare point of the main pole, magnetic fields are leaked from the flare portion to the trailing side shield, so that it is necessary that the thickness of the trailing side shield be less than the throat height as shown in FIG. 11. As described above, while it is necessary that the throat height be about 300 nm or less and since it is typically from about 100 to 300 nm, the thickness (Gd) from the air bearing surface of the trailing side shield is from about 50 to 250 nm.

Figure 14:
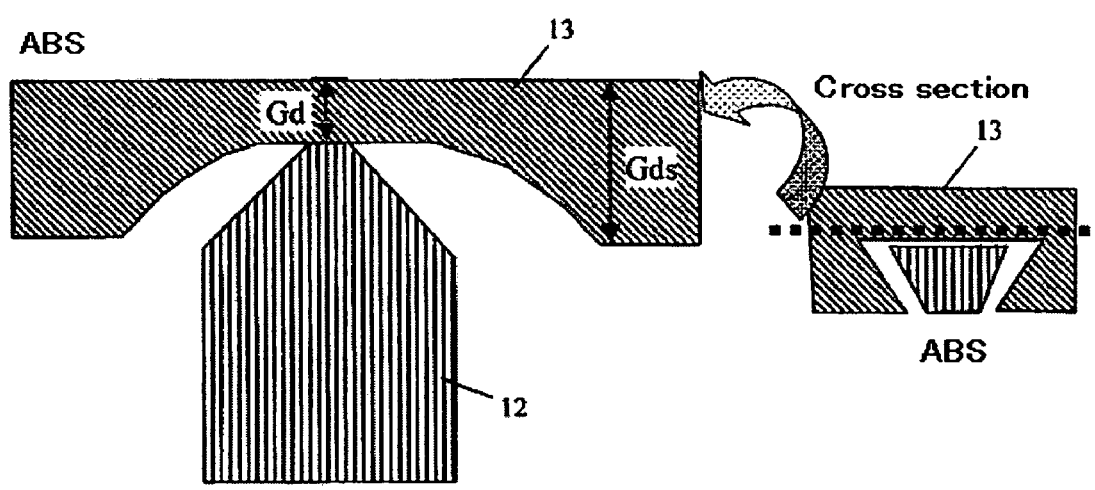
FIG. 14 is a schematic view showing the thickness of a trailing side shield from an air bearing surface just above a main pole.
Figure 1:
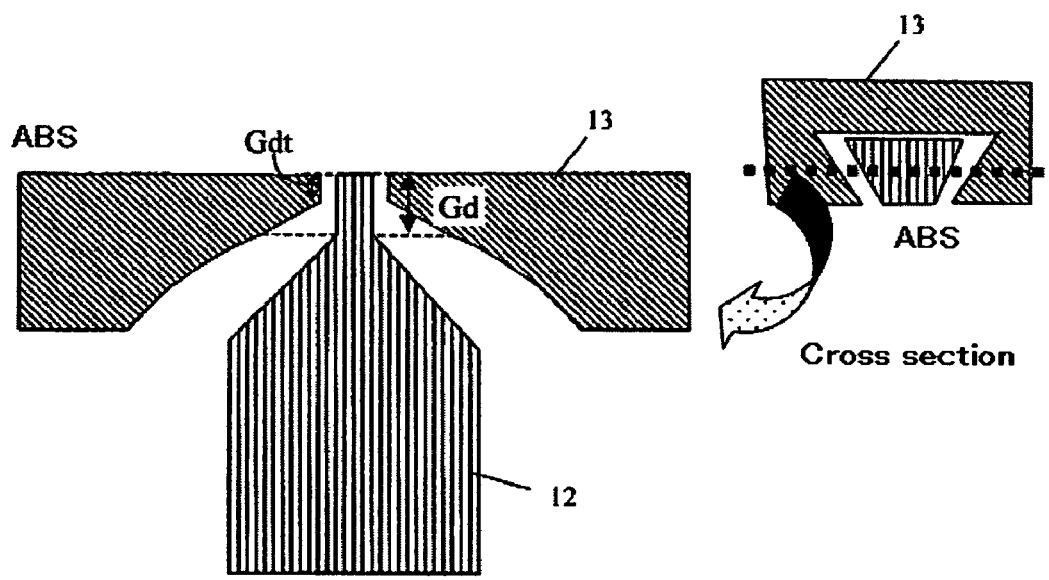
Figure 1:
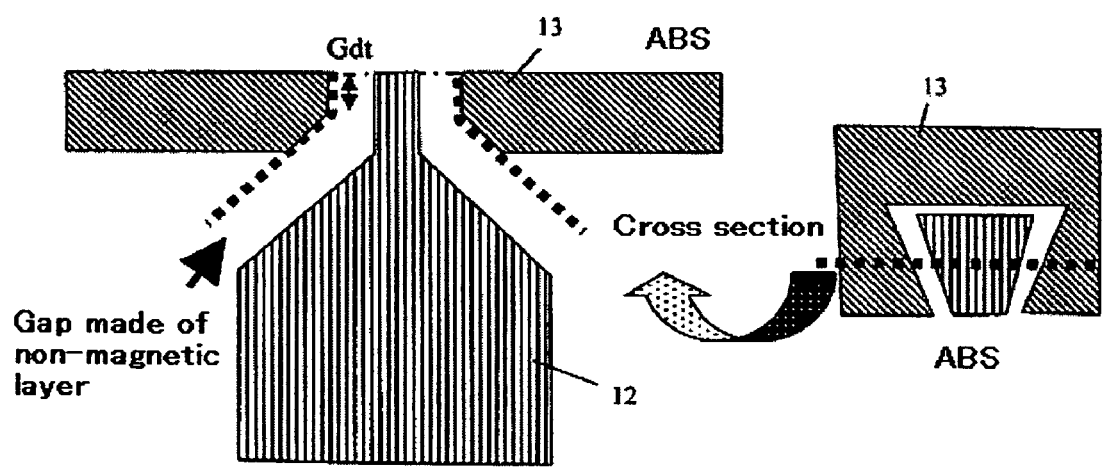

Another method of suppressing the decrease in the writing magnetic field is a method of changing the thickness of the trail side shield 13 for the trailing side and the lateral side of the main pole. Decrease of the writing magnetic field of the main pole can be suppressed by making the thickness of the trailing side shield 13 smaller on the lateral side than on the trailing side. FIG. 14 is a schematic view showing the thickness from the air bearing surface of the trailing side shield 13 at a portion just above the main pole (trailing side). Further, FIG. 15 is a schematic view showing the change of the thickness from the air bearing surface of the trailing side shield 13 on a straight line drawn in cross-track direction passing through the center for the width of the main pole in the cross-track direction. The drawing shows the thickness Gds from the air bearing surface of the trailing side shield 13 at a portion away in the cross-track direction just above the gap film, and a thickness Gdt from the air bearing surface of the trailing side shield 13 at a portion adjacent with the lateral side of the main pole 12 at the middle height for the width in the cross-track direction of the main pole 12. As shown in FIG. 14, the thickness Gds at a portion away from the main pole 12 is larger than the thickness Gd above the main pole 12, with respect to the thickness from the air bearing surface of the trailing side shield 13, when taken along a cross section of the trailing side shield 13 perpendicular to the air bearing surface along a straight line drawn in the cross-track direction at a position just above the gap film on the trailing side of the main pole 12.

The broken line in FIG. 15 shows the thickness Gd on the trailing side. FIG. 16 shows a relation between the shape of the trailing side shield 13 on the lateral side of the main pole 12 and the gap. A flare point is present in the main pole 12 and when a gap film is formed with an inorganic insulation film on the lateral surface, the flare point of the gap approaches the air bearing surface as shown in FIG. 16. Accordingly, the thickness Gdt of the trailing side shield 13 on the lateral side of the main pole can be made thinner than that on the trailing side. In this case, the thickness of the trailing side shield 13 on the trailing side may be larger than that of the throat height. This is because the magnetic fields leaked from the main pole to the trailing side shield 13 are decreased since the thickness on the side is thin.

As shown in FIG. 2, since the skew angle is present in the hard disk drive, it is necessary that the shape of the writing head at the main pole air bearing surface be in a trapezoidal shape. As shown in FIG. 6(b), it is preferred to form the trailing side shield 13 along the main pole in the inverted trapezoidal shape in view of preventing side writing.

Figure 17:
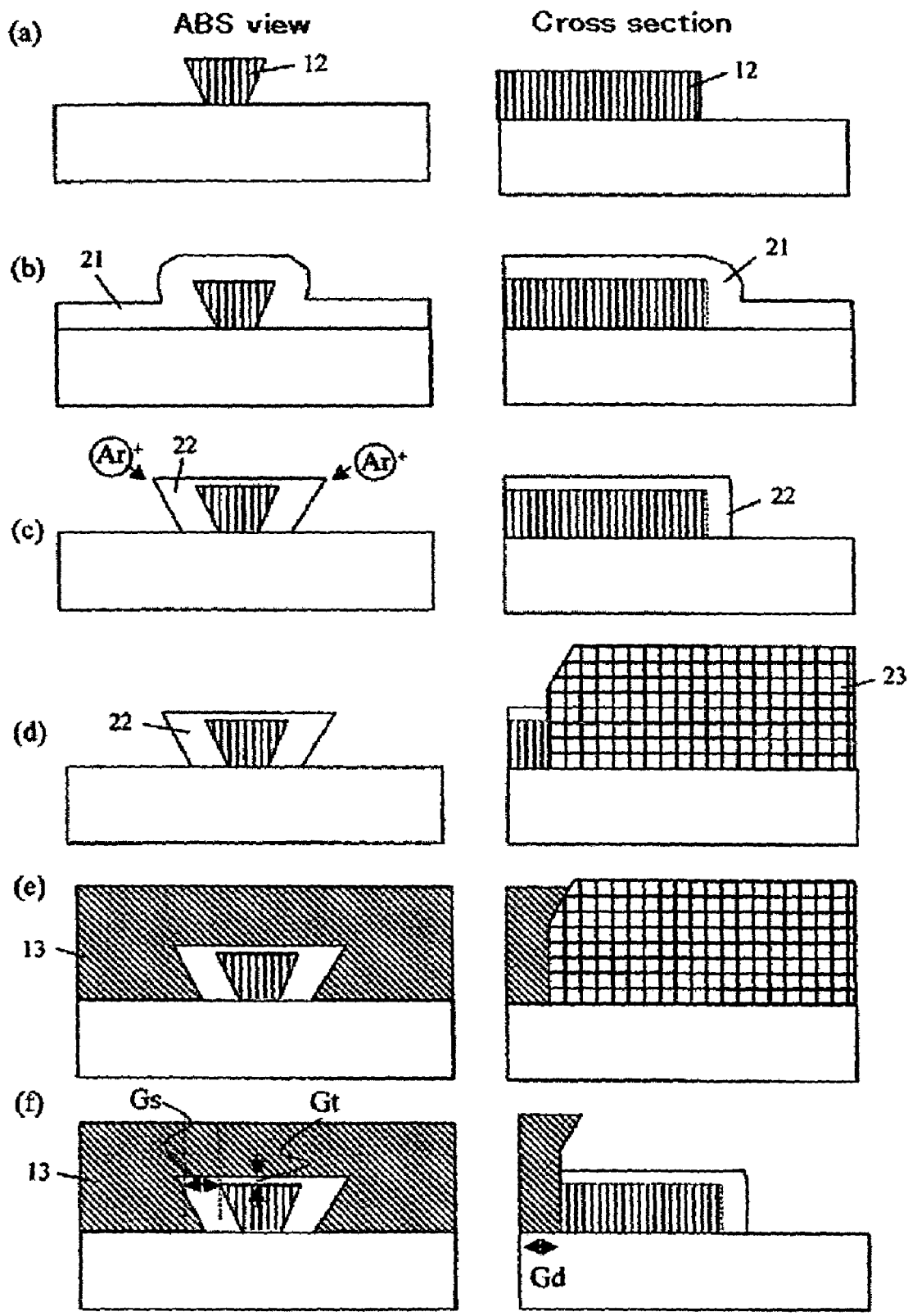
FIG. 17 is a schematic view showing the steps of forming a trailing side shield according to the invention.

FIG. 17 shows a schematic view for manufacturing steps of a writing head according to an embodiment of the invention. The left side of the drawing as viewed from the air bearing surface and the right side is a cross-sectional view in the direction of the sensor height.

FIG. 17 shows at (a) a main pole 12 in the trapezoidal shape formed on an inorganic insulative film. It shows at (b) an $Al_2O_3$ film 21 formed by sputtering over the main pole. While $Al_2O_3$ used so far as the gap film material is used in this embodiment, SiC, AlN, $Ta_2O_5$, TiC, $TiO_2$, $SiO_2$ and the like may also be used. As another film deposition method, plasma CVD may also be used. In this case, films such as of Si, SiON, SiC, $SiO_2$, $Si_3N_4$ and diamond-like carbon can be used for the gap film. Then, it shows at (c) a gap film 22 formed by etching the $Al_2O_3$ film formed in the step (b) by ion milling. Milling may be conducted at an incident angle of ions (milling angle)

within a range of 45 to 60 degree and it is also easy, as shown in the drawing, to fabricate the film into a shape conforming the taper of the main pole by making the gap the thinner on the trailing side and thicker on the lateral side of the main pole.

After depositing a seed layer for plating (not shown in the drawing), a resist frame pattern 23 is formed as shown at (d). The plating seed layer may be a magnetic film or a non-magnetic film. In a case of the non-magnetic film, since the layer constitutes a portion of the gap distance, it is necessary to include this in the gap distance. The photoresist pattern may be formed by using a commercially available novolac resin based photoresist and exposing by an i-ray stepper, or by using a commercially available polyhydroxyl styrene based photoresist and exposing by a KrF excimer laser stepper. In the drawing, a taper is formed to an upper portion of the photoresist form. Such a photoresist shape can be obtained by controlling the focus of the stepper during exposure. For example, a plus focus may be used in the stepper manufactured by Nikon Co., while a minus focus may be used in the stepper manufactured by Canon Co. The drawing shows at (e) plating of a magnetic film as a trailing side shield 13 by using the plating seed layer and the photoresist film formed at (d). Due to the shape of the photoresist frame formed at (d), it is possible to form a shape in which the upper plating portion, that is, an upper portion of a part as a shield (a portion away from the main pole to the trailing side) is increased, which can prevent defoliation of the trailing side shield during fabrication of the air bearing surface. As the magnetic film, a customarily used permalloy may be used. Naturally, it may be a different magnetic film, for example, made of CoNiFe, FeNi, CoFeCu, etc. Further, in a case of using, for example, CoFeCu, since a non-magnetic layer at high Cu content can be prepared by changing the plating condition therefor, a multi-layered film of magnetic layers and non-magnetic layers can be formed. It is of course possible to apply a method of repeating the steps of plating a magnetic film (NiFe) and then plating a non-magnetic film (Cr) while changing the plating bath. They may be laminated with the thickness of the non-magnetic layer at 1 to 3 nm and the thickness of the magnetic layer at 10 to 50 nm. A state of removing an unnecessary portion of the photoresist frame, the plating seed layer and the plating layer and forming a trailing side shield 13 on the mail pole 12 by way of the gap film 22 is shown at (f). In the final form of the head, the trailing side shield 13 is fabricated to a desired thickness Gd by fabrication of the air bearing surface.

Figure 18:
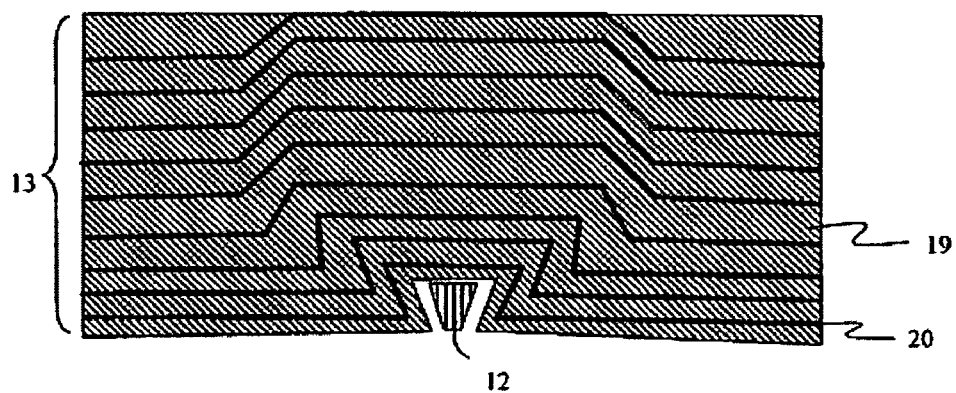
FIG. 18 is a schematic view of a trailing side shield using a multi-layered film.

FIG. 18 shows an example of forming the trailing side shield with a multi-layered film as described previously. They are laminated with a thickness of the non-magnetic layer (Cr) 20 at 1 to 3 nm and the thickness of the magnetic layer (NiFe) 19 at 10 to 50 nm. When the trailing side shield is formed of a multi-layered film, the magnetic domain control is possible to suppress noises.

Figure 19:
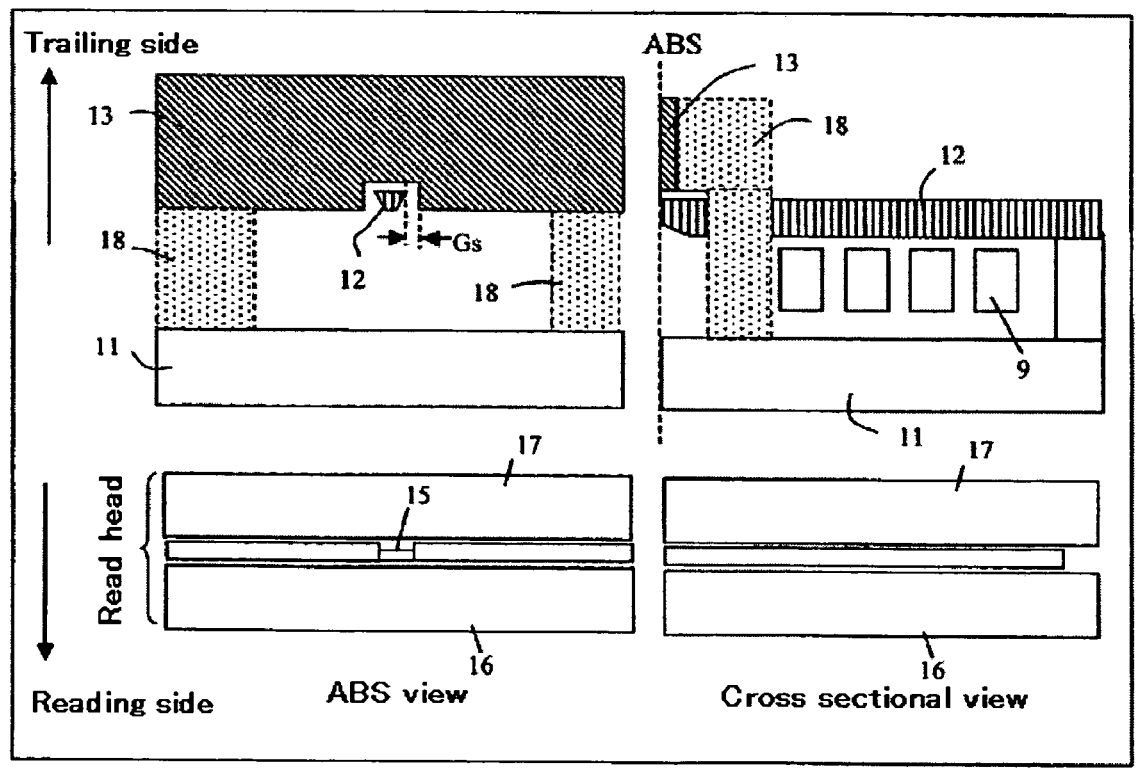
FIG. 19 is a schematic view of an example in which a trailing side shield is connected by way of a connection pole to a return pole.
Figure 20:
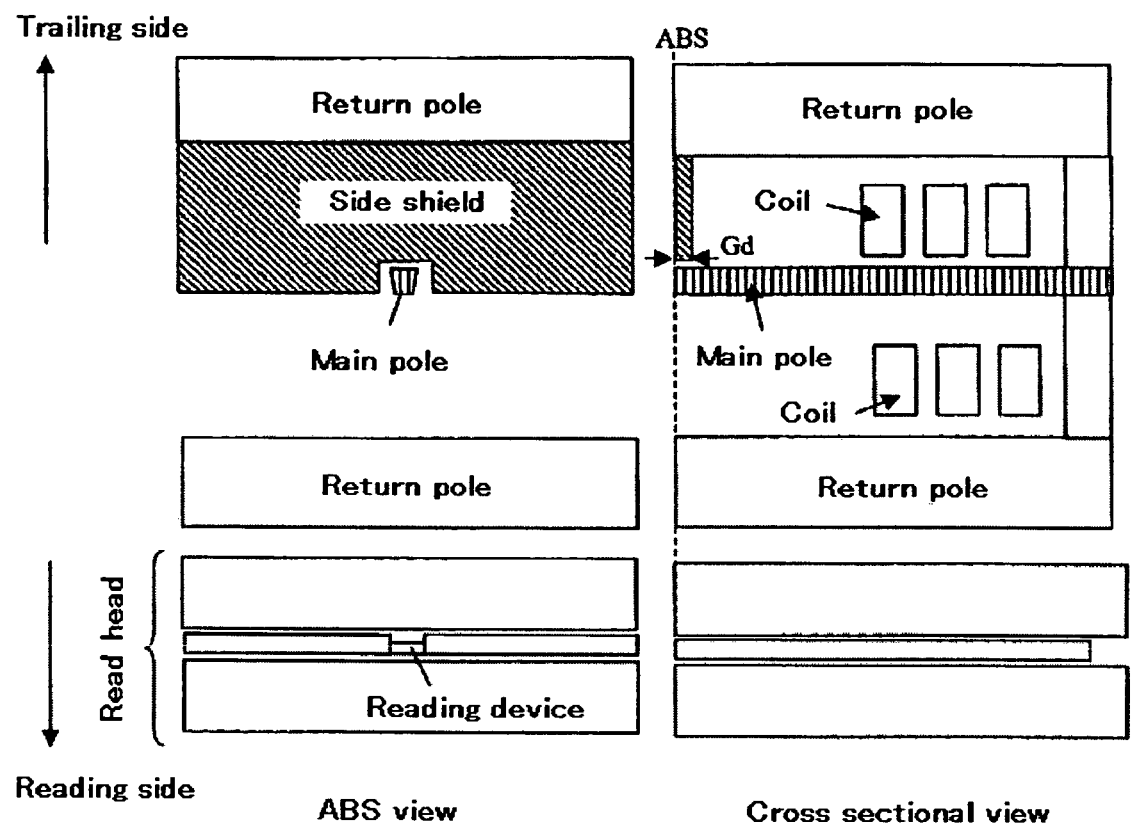
FIG. 20 is a schematic view of a perpendicular recording head provided with a side shield.

FIG. 19 shows an example of connecting a trailing side shield 13 by way of a connection magnetic pole 18 with a return pole 11. The method of manufacturing the trailing side shield is identical with that in the steps shown in FIG. 17. As the material for the connection pole 18, a soft magnetic material is preferred and a permalloy can be used for instance. Other soft magnetic materials may also be used with no problems.

By mounting a magnetic head for perpendicular recording, the track and the linear density can be improved, and a magnetic recording apparatus at a longitudinal recording density of about 200 Gbit/in$^2$ can be manufactured.

It is to be understood that the above description is intended to be illustrative and not restrictive. Many embodiments will be apparent to those of skill in the art upon reviewing the above description. The scope of the invention should, therefore, be determined not with reference to the above description, but instead should be determined with reference to the appended claims along with their full scope of equivalents.

What is claimed is:

1. A magnetic head comprising a main pole, a return pole, and a trailing side shield disposed in a cross-track direction and in a trailing direction of the main pole,
    wherein a gap distance Gt between the main pole and the trailing side shield in the trailing direction, and a gap distance Gs between an edge on a trailing side of the main pole and the trailing side shield in the cross-track direction satisfy a relation: Gs>Gt, and
    wherein a thickness Gd from an air bearing surface of the trailing side shield for a portion of the trailing side shield opposing to the main pole is equal to or less than a throat height of the main pole, the throat height being the distance from the air bearing surface to a flare point of the main pole where a track width of the main pole flares;
    wherein the return pole is closer to a trailing end of the magnetic head than the trailing side shield, and the trailing side shield is disposed between the main pole and the return pole.

2. The magnetic head according to claim 1, wherein the thickness from the air bearing surface of the trailing side shield is larger at a position towards the trailing side than that at a position opposing to the main pole on the trailing side of the main pole.

3. The magnetic head according to claim 1, wherein the main pole has a shape that a width on the trailing side is larger than a width on a leading side at the air bearing surface.

4. The magnetic head according to claim 1, wherein the main pole has a shape in which a leading side at a top end is tapered in a direction of the air bearing surface such that a thickness is minimized at the air bearing surface.

5. The magnetic head according to claim 1, wherein the trailing side shield is magnetically coupled with the return pole.

6. The magnetic head according to claim 1, wherein the magnetic head has a pair of reading head shields disposed to the main pole on a side opposite to the return pole and a magneto-resistive device disposed between the pair of reading head shields.

7. A magnetic head comprising a main pole, a return pole, and a trailing side shield disposed in a cross-track direction and in a trailing direction of the main pole,
    wherein a gap distance Gt between the main pole and the trailing side shield in the trailing direction, and a gap distance Gs between an edge on a trailing side of the main pole and the trailing side shield in the cross-track direction satisfy a relation: Gs>Gt,
    wherein a thickness Gd from an air bearing surface of the trailing side shield for a portion of the trailing side shield opposing to the main pole is equal to or less than a throat height of the main pole, the throat height being the distance from the air bearing surface to a flare point of the main pole where a track width of the main pole flares, and
    wherein the trailing side shield comprises a multi-layered film of magnetic layers and non-magnetic layers.

8. A magnetic head comprising a main pole, a return pole, and a trailing side shield disposed in a cross-track direction and in a trailing direction of the main pole,
    wherein a gap distance Gt between the main pole and the trailing side shield in the trailing direction, and a gap distance Gs between an edge of a trailing side of the main pole and the trailing side shield in the cross-track direction satisfy a relation: Gs>Gt, and wherein thicknesses from an air bearing surface for a portion of the trailing side shield opposed to the main pole are such that a thickness Gdt for an opposed portion opposing to the main pole from the cross-track direction is smaller than a thickness Gd for the opposed portion opposing from the trailing side of the main pole to the main pole;

wherein the return pole is closer to a trailing end of the magnetic head than the trailing side shield, and the trailing side shield is disposed between the main pole and the return pole.

9. The magnetic head according to claim 8, wherein the thickness from the air bearing surface of the trailing side shield is larger at a position towards the trailing side than that at a position opposing to the main pole on the trailing side of the main pole.

10. The magnetic head according to claim 8, wherein the main pole has a shape that a width on the trailing side is larger than a width on a leading side of the air bearing surface.

11. The magnetic head according to claim 8, wherein the main pole has a shape in which a leading side at a top end is tapered in a direction of the air bearing surface such that a thickness is minimized at the air bearing surface.

12. The magnetic head according to claim 8, wherein the trailing side shield is magnetically coupled with the return pole.

13. The magnetic head according to claim 8, wherein the magnetic head has a pair of reading head shields disposed to the main pole on a side opposite to the return pole and a magneto-resistive device disposed between the pair of reading head shields.

14. A magnetic head comprising a main pole, a return pole, and a trailing side shield disposed in a cross-track direction and in a trailing direction of the main pole, wherein a gap distance Gt between the main pole and the trailing side shield in the trailing direction, and a gap distance Gs between an edge of a trailing side of the main pole and the trailing side shield in the cross-track direction satisfy a relation: Gs>Gt;

wherein thicknesses from an air bearing surface for a portion of the trailing side shield opposed to the main pole are such that a thickness Gdt for an opposed portion opposing to the main pole from the cross-track direction is smaller than a thickness Gd for the opposed portion opposing from the trailing side of the main pole to the main pole, and wherein the trailing side shield comprises a multi-layered film of magnetic layers and non-magnetic layers.

15. A magnetic recording and reproducing apparatus including a magnetic recording medium comprising a magnetic recording layer and a soft magnetic underlayer, a magnetic medium driving section for driving the magnetic recording medium, a magnetic head conducting writing operation and reading operation to the magnetic recording medium, and an actuator for driving the magnetic head relative to the magnetic recording medium, wherein the magnetic head comprises a main pole, a return pole, a trailing side shield disposed in a cross-track direction and in a trailing direction of the main pole and formed further from a trailing end of the magnetic head than the return pole, a pair of reading shields disposed to the main pole on a side opposite to the return pole and a magneto-resistive device disposed between the pair of the reading shields, wherein a gap distance Gt between the main pole and the trailing side shield in the trailing direction, and a gap distance Gs between an edge on a trailing side of the main pole and the trailing side shield in the cross-track direction satisfy a relation: Gs>Gt, and wherein a thickness Gd from an air bearing surface of the trailing side shield for a portion of the trailing side shield opposing to the main pole is equal to or less than a throat height of the main pole, the throat height being the distance from the air bearing surface to a flare point of the main pole where a track width of the main pole flares.

16. A magnetic recording and reproducing apparatus including a magnetic recording medium comprising a magnetic recording layer and a soft magnetic underlayer, a magnetic medium driving section for driving the magnetic recording medium, a magnetic head conducting writing operation and reading operation to the magnetic recording medium, and an actuator for driving the magnetic head relative to the magnetic recording medium, wherein the magnetic head comprises a main pole, a return pole, a trailing side shield disposed in a cross-track direction and in a trailing direction of the main pole and formed further from a trailing end of the magnetic head than the return pole, a pair of reading shields disposed to the main pole on a side opposite to the return pole and a magneto-resistive device disposed between the pair of the reading shields, wherein a gap distance Gt between the main pole and the trailing side shield in the trailing direction, and a gap distance Gs between an edge on a trailing side of the main pole and the trailing side shield in the cross-track direction satisfy a relation: Gs>Gt, and wherein thicknesses from an air bearing surface for an opposed portion of the trailing side shield opposing to the main pole are such that a thickness Gd of the opposed portion opposing from the trailing side of the main pole to the main pole is larger than a thickness Gdt for the opposed portion opposing to the main pole in the cross-track direction.

* * * * *